United States Patent [19]

Martin

[11] Patent Number: 5,263,563
[45] Date of Patent: Nov. 23, 1993

[54] FLUID-FRICTION COUPLING

[75] Inventor: Hans Martin, Stuttgart, Fed. Rep. of Germany

[73] Assignee: Behr GmbH & Co., Stuttgart

[21] Appl. No.: 879,989

[22] Filed: May 8, 1992

[30] Foreign Application Priority Data

May 10, 1991 [DE] Fed. Rep. of Germany ....... 4115299

[51] Int. Cl.$^5$ ............................................. F16D 35/02
[52] U.S. Cl. ................... 192/58 B; 192/82 T
[58] Field of Search ........................... 192/58 B, 82 T

[56] References Cited

U.S. PATENT DOCUMENTS

| | | | |
|---|---|---|---|
| 3,339,689 | 9/1967 | Sutaruk | 92/58 B X |
| 3,363,734 | 1/1968 | Sabat | 192/58 B |
| 4,007,819 | 2/1977 | Maci . | |
| 4,662,495 | 5/1987 | Brunken | 192/58 B |
| 4,667,791 | 5/1987 | Martin et al. | 192/58 B |
| 4,676,355 | 6/1987 | Brunken et al. . | |
| 4,903,643 | 2/1990 | Takikawa et al. | 192/82 T X |
| 4,930,457 | 6/1990 | Tamai | 192/82 T X |

FOREIGN PATENT DOCUMENTS

| | | | |
|---|---|---|---|
| 1216036 | 5/1966 | Fed. Rep. of Germany . | |
| 2099960 | 12/1982 | United Kingdom | 192/82 T |
| 2153980 | 8/1985 | United Kingdom | 192/82 T |

Primary Examiner—Richard M. Lorence
Attorney, Agent, or Firm—Walter Ottesen

[57] ABSTRACT

A fluid-friction coupling includes a housing defining a space. The housing includes a partition wall separating the space into a reservoir chamber defining an oil-wet region and a work chamber. A drive disc is rotatably mounted in the work chamber and a drive shaft is connected to the drive disc so as to be rotatable therewith. The partition wall has a valve port formed therein. A valve arm is mounted in the housing for controlling the valve port and is movable in a closure direction through a total displacement (s) from an open position wherein the valve port is clear to a closed position wherein the valve port is closed. An external bimetal is mounted outside of the housing for actuating the valve arm so as to move the valve arm from the open position to the closed position. An internal bimetal is mounted in the oil-wet region of the reservoir chamber for imparting a movement to the valve arm in the closure direction when the internal bimetal reaches a predetermined limit temperature. The internal bimetal is an internal bimetal member having a first end at which the bimetal member is attached to the housing. And stop is mounted in the reservoir chamber for limiting the movement imparted to the valve arm by the internal bimetal member to only a partial displacement ($s_1$) toward the closed position thereby leaving a residual displacement ($s_0$) of the total displacement (s).

15 Claims, 2 Drawing Sheets

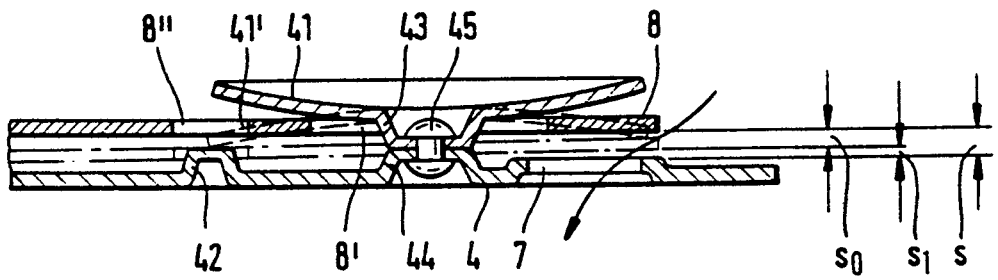
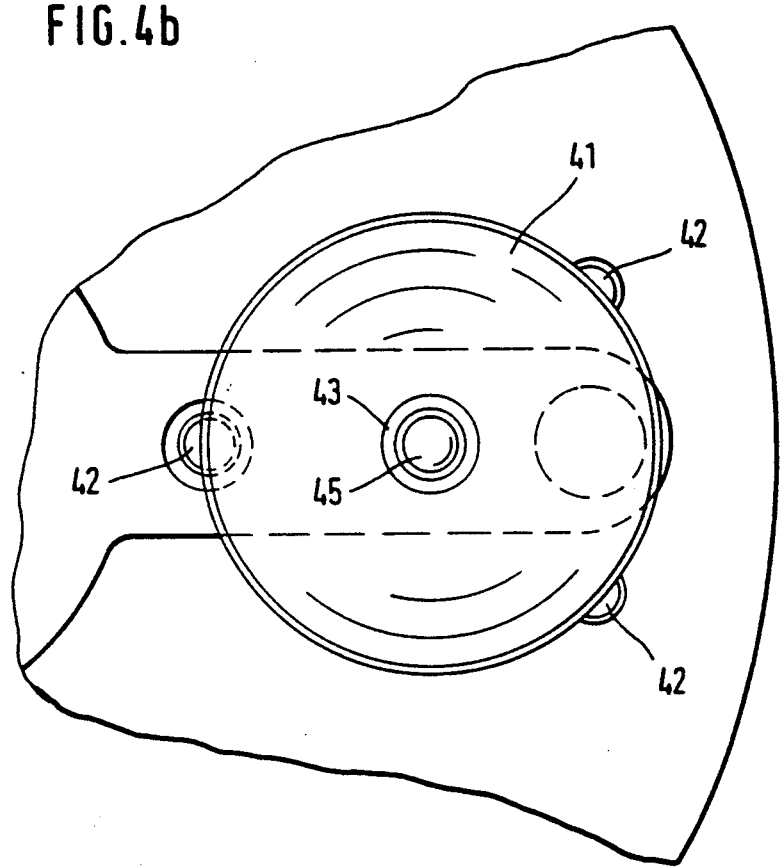
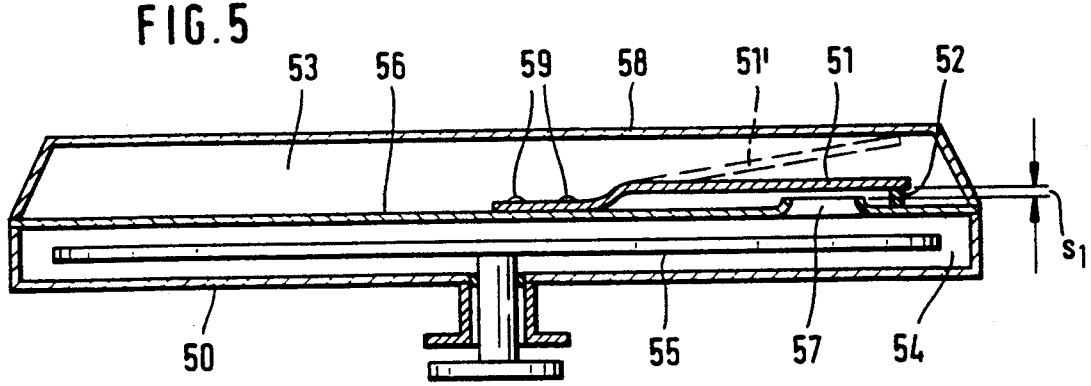

FLUID-FRICTION COUPLING

FIELD OF THE INVENTION

The invention relates to a fluid-friction coupling of the kind disclosed, for example, in U.S. Pat. No. 4,662,495.

BACKGROUND OF THE INVENTION

In fluid-friction couplings of the kind referred to above, the valve arm controls the flow of fluid from the reservoir into the work space. The valve arm is controlled on the one hand by a bimetal mounted outside of the coupling housing (a so-called external bimetal) and, on the other hand, by a further bimetal mounted within the reservoir of the coupling (a so-called internal bimetal). The internal bimetal is attached to the partition wall between the reservoir and the work chamber and operates on the valve arm in the closure direction when a specific limit temperature is reached so that the valve arm closes the valve port and shuts the coupling. In this way, an overheating of the fluid, that is the viscous silicone oil, is avoided. It is disadvantageous in this arrangement that the valve port is not positively closed exclusively by the actuation of the inner bimetal so that the fan speed then drops to an undetermined value. Accordingly, this coupling tends to chatter.

SUMMARY OF THE INVENTION

It is an object of the invention to provide an effective overheat protection for the coupling and the viscous medium and to thereby control the fan speed to a stable defined low value.

The fluid-friction coupling of the invention includes: a housing defining a space; the housing including a partition wall separating the space into a reservoir chamber defining an oil-wet region and a work chamber; a drive disc rotatably mounted in the work chamber; a drive shaft connected to the drive disc so as to be rotatable therewith; the partition wall having a valve port formed therein; a valve arm mounted in the housing for controlling the valve port and being movable in a closure direction through a total displacement (s) from an open position wherein the valve port is clear to a closed position wherein the valve port is closed; external bimetal means mounted outside of the housing for actuating the valve arm so as to move the valve arm from the open position to the closed position; internal bimetal means mounted in the oil-wet region of the reservoir chamber for imparting a movement to the valve arm in the closure direction when the internal bimetal means reaches a predetermined limit temperature; the internal bimetal means being an internal bimetal member having a first end at which the bimetal member is attached to the housing; and, stop means mounted in the reservoir chamber for limiting the movement imparted to the valve arm by the internal bimetal member to only a partial displacement ($s_1$) toward the closed position thereby leaving a residual displacement ($s_0$) of the total displacement (s).

The above limit temperature can, for example, be 150° C.

According to a feature of the invention, a displacement limit in the form of a stop is provided for the internal bimetal. This causes the valve arm to not completely close the valve port when the inner bimetal operates; instead, a residual stroke or residual cross section is left free through which silicone oil can continue to flow from the reservoir into the work chamber. In this way, the fan speed drops to a stable low value. The magnitude of the fan speed can be adjusted by the stop or, more specifically, by the remaining residual cross section.

In another embodiment of the fluid-friction coupling of the invention, no external bimetal is provided and, instead, only an internal bimetal is provided which is arranged within the reservoir. This fluid-friction coupling is therefore a so-called torque-controlled coupling. Here too, a stop for limiting displacement of the stroke of the inner bimetal is provided whereby the same above-mentioned advantages are provided.

According to another feature of the invention, the internal bimetal is configured as a snap disc which jumps from a concave form into a convex form and thereby actuates the valve arm in a sudden and positive manner; but again, only up to a specific stop which allows a residual cross section to remain open. With the bimetal configured as a snap disc, it is ensured that the control intervenes only relatively late via the inner bimetal which is superposed on the control via the external bimetal; that is, the internal bimetal intervenes when the critical oil temperature within the coupling is reached.

BRIEF DESCRIPTION OF THE DRAWINGS

The invention will now be described with reference to the drawings wherein:

FIGS. 4a and 4b show a fourth embodiment of the invention wherein the coupling is a temperature-controlled fluid-friction coupling; and, FIG. 5 is still another embodiment of the invention wherein the coupling is a torque-controlled coupling having an internal bimetal.

DESCRIPTION OF THE PREFERRED EMBODIMENTS OF THE INVENTION

Figure 1A:
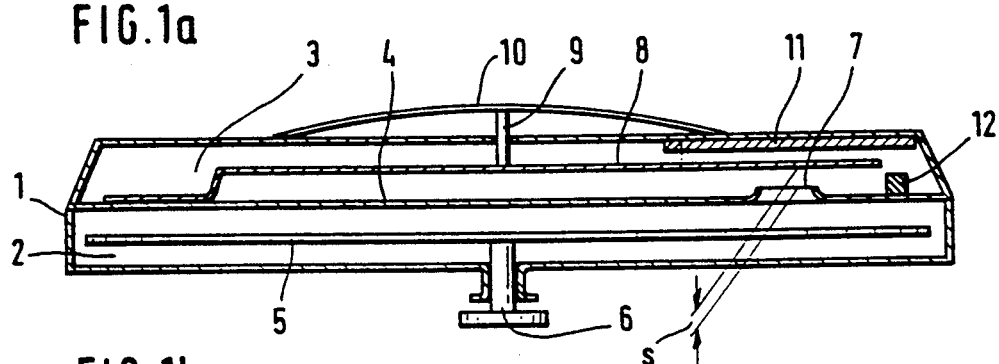
FIGS. 1a and 1b are side elevation views, partially in section, of a first embodiment of the fluid-friction coupling according to the invention.
Figure 1B:
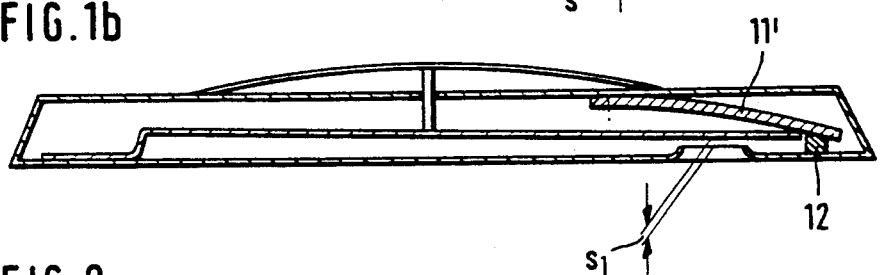

The fluid-friction coupling shown in FIG. 1 includes a coupling housing 1 having a work chamber 2 which is separated by a partition wall 4 from a reservoir 3. In the work chamber 2, a so-called primary disc 5 is rotatably mounted and is fixedly connected to the drive shaft 6 so as to rotate therewith. A valve port 7 is provided in the partition wall 4. The valve port 7 is controlled via the valve arm 8 which is actuated by a bimetal element 10 mounted on the outside of the coupling with the valve arm 8 being actuated by means of a control pin 9. Baffles (not shown) are provided in the work chamber and a return-flow opening (not shown) is provided in the partition wall 4 for the recirculation of the viscous medium. This fluid-friction coupling having the foregoing elements is known per se.

According to a feature of the invention, a so-called internal bimetal 11 is provided which is attached at one end to the inner wall surface of the coupling housing 1 within the reservoir 3. This bimetal 11 is so configured that it becomes arcuate when a specific limit temperature is reached and, in this way, comes into contact with the valve arm 8 and moves the valve arm 8 in the closure direction, that is, in the direction toward the valve port 7. However, this closure movement takes place only so far until the free end of the bimetal 11 has reached the stop 12. The valve arm then still does not lie on the valve port 7 with the free end thereof; instead, the arm 8 is at a spacing $s_1$ with respect to the valve port 7. The spacing $s_1$ is the so-called residual stroke. Insofar as there is no further movement via the control pin 9 on the valve arm 8 from the outer bimetal 10, the valve arm 8 remains in this position, that is, the valve arm 8 leaves a through-flow cross section free in correspondence to the residual stroke $s_1$. The viscous medium (silicone oil) can then continue to flow from the reservoir 3 into the work chamber 2 so that there a residual torque can continue to be transmitted so that the output speed of the coupling does not drop off completely. The silicone oil which flows into the work chamber 2 is pumped back into the reservoir 3 through a return flow channel by means of a return flow pump (not shown) so that a continuous circulation is maintained.

Figure 2A:
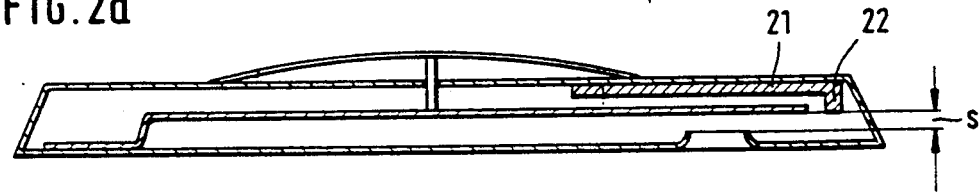
FIGS. 2a and 2b show a second embodiment of the fluid-friction coupling of the invention having a modified bimetal end stop.
Figure 2B:
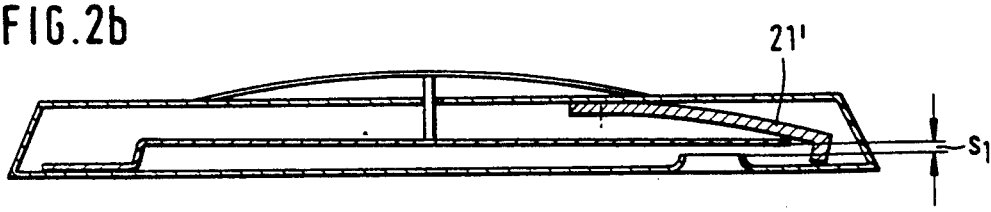

A further embodiment of the invention is shown in FIGS. 2a and 2b wherein the modified bimetal is identified by reference numeral 21 and the stop by reference numeral 22. From FIGS. 2a and 2b, it can be seen that the stop 22 is connected to the bimetal 21 in that the stop is configured as an angle at the end of the bimetal 21. In this regard, the bimetal unit 21/22 operates in the same manner as described with respect to FIGS. 1a and 1b.

Figure 3A:
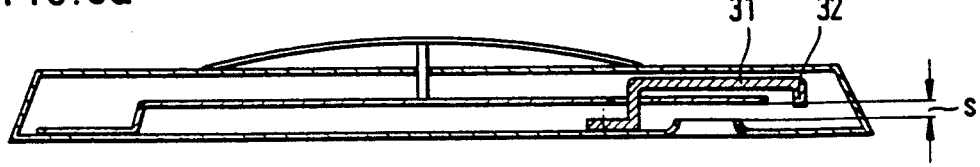
FIGS. 3a and 3b show still another embodiment of the fluid-friction coupling of the invention wherein the bimetal is attached to a partition wall.
Figure 3B:
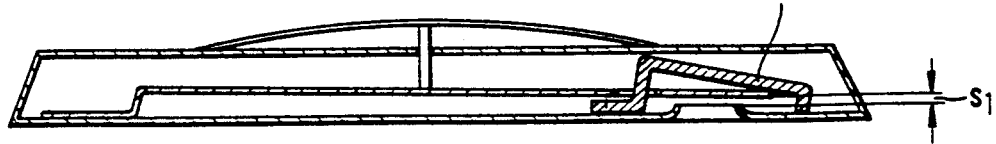

A further embodiment of the fluid-friction coupling of the invention is shown in FIGS. 3a and 3b having a bimetal unit 31/32 with one end of the bimetal 31 being attached to the partition wall and the bimetal projecting through a corresponding opening in the valve arm to the upper side thereof. When operating, the bimetal 31 deforms as shown in FIG. 3b so that the valve arm, in turn, is moved in the closure direction with, however, a residual stroke $s_1$ remaining.

A still further variation of the bimetal unit is shown in the embodiment of the fluid-friction coupling shown in FIGS. 4a and 4b. Here, the bimetal is configured as a plate-shaped snap disc 41. This bimetal snap disc is configured to be slightly concave below the operating temperature as shown in FIG. 4a by the solid line depiction thereof. In its center, the snap disc 41 has a central projection 43 with which the snap disc 41 lies against a corresponding projection 44 of the partition wall 4. The bimetal disc 41 and the partition wall 4 are connected to each other by a rivet 45 in the region of the two projections 43 and 44.

The bimetal disc 41 extends with its projection through the valve arm 8 via a larger opening 8' formed in this arm so that the arm can move into its rest position unhindered by the bimetal disc 41.

Further projections 42, preferably three further projections, are provided on the partition wall with each two mutually adjacent projections 42 being separated from each other by approximately 120°. These projections 42 are arranged approximately within the region of the outer diameter of the snap disc 41. The valve arm 8 has a further cutout 8" which allows the projection 42 arranged in this region to project through the valve arm 8 when the arm 8 is moved in the closure direction.

The function of this bimetal snap disc takes place in a similar manner as with the embodiments described above. Accordingly, first the valve arm 8 is controlled via the outer bimetal and thereby more or less clears the valve port 7 with a total valve stroke (s) being made available. The bimetal disc 41 starts to operate when a specific limit temperature is reached in the interior of the coupling and deforms from its concave start configuration into the convex configuration shown in phantom outline. The movement from the concave configuration to the convex configuration takes place with an abrupt and rapid snap-like movement. With this movement, the snap disc 41 abruptly presses against the valve arm 8 and moves this arm in the closure direction until the snap disc comes to rest with its outer periphery against the stops 42. In this way, the movement of the snap disc is limited and likewise the movement of the valve arm 8 which only passes through the partial stroke $s_0$ and then remains in the position shown in phantom outline; that is, the residual stroke of $s_1$ remains.

However, less viscous medium continues to flow into the work chamber through the through-flow cross section corresponding to the residual stroke $s_1$ whereby the fan speed drops to a value which is approximately constant. The development of heat thereby remains approximately constant and the coupling cannot overheat. As soon as the temperature in the interior of the coupling has again dropped below the limit value of the snap disc 41, this disc snaps back to its original concave start position. In this position, the valve arm 8 is no longer influenced by the inner bimetal 41; instead only by the outer bimetal 10.

FIG. 5 shows a fluid-friction coupling 50 which is configured as a so-called torque-controlled coupling; that is, the coupling has no external bimetal which controls the valve arm. Instead, the valve arm controls itself with increased load. This coupling 50 has a work chamber 54 wherein the drive disc 55 is rotatably mounted and transmits the torque via a viscous medium arranged in gaps at both sides thereof. A reservoir 53 is separated from the work chamber 54 by a partition wall 56. The reservoir 53 communicates with the work chamber 54 via a return flow port (not shown). A bimetal 51 is attached to the partition wall 56 by means of rivets 59. The bimetal overlaps a valve port 57 in the partition wall 56 with its free end. The bimetal (solid line) then lies against a stop 52 which is attached to the partition wall 56. The stop 52 is dimensioned in elevation such that the valve arm 51 leaves a residual stroke $s_1$ when it lies against the stop 52. The viscous medium from the reservoir 53 flows into the work chamber 54 through this residual gap or stroke $s_1$. The phantom outline shows the bimetal 51' in its open position; that is, below the above-mentioned limit temperature. In this position 51', the valve port 57 is therefore completely opened. When the temperature in the interior of the coupling (that is, in the region of the bimetal 51') increases and the limit temperature of the bimetal is reached, the bimetal then moves continuously or abruptly, depending on its configuration, in the closure direction; that is, in the direction toward the stop 52.

In contrast to the embodiments described above, the valve arm controlled by the outer bimetal is here omitted in the reservoir and, in lieu thereof, the bimetal 51 itself operates as a valve arm. Accordingly, it is possible to protect a torque-controlled coupling against overheating by means of this internal bimetal 51.

It is understood that the foregoing description is that of the preferred embodiments of the invention and that various changes and modifications may be made thereto without departing from the spirit and scope of the invention as defined in the appended claims.

What is claimed is:

1. A fluid-friction coupling comprising:

a housing defining a space;

said housing including a partition wall separating said space into a reservoir chamber defining an oil-wet region and a work chamber;

a drive disc rotatably mounted in said work chamber;

a drive shaft connected to said drive disc so as to be rotatable therewith;

said partition wall having a valve port formed therein for permitting a flow of viscous medium from said reservoir chamber to said work chamber;

a valve arm mounted in said housing for controlling said valve port and being movable in a closure direction through a total displacement (s) from an open position wherein said valve port is clear for passing a first flow of the viscous medium from said reservoir chamber to said work chamber to a closed position wherein said valve port is closed and said flow is interrupted;

external bimetal means mounted outside of said housing for actuating said valve arm so as to move said valve arm from said open position to said closed position;

internal bimetal means mounted in said oil-wet region of said reservoir chamber for imparting a movement to said valve arm in the closure direction when said internal bimetal means reaches a predetermined limit temperature;

said internal bimetal means being an internal bimetal member having a first end at which said bimetal member is attached to said housing;

stop means mounted in said reservoir chamber for limiting the movement imparted to said valve arm by said internal bimetal member to only a partial displacement ($s_1$) toward said closed position so as to cause said lever arm to leave a residual cross section through which a second flow of said viscous medium can pass from said reservoir chamber to said work chamber which is less than said first flow; and, said valve arm leaving a residual displacement ($s_0$) of said total displacement (s) after moving through said partial displacement ($s_1$).

2. The fluid-friction coupling of claim 1, said stop means being a stop provided on said partition wall.

3. The fluid-friction coupling of claim 1, said bimetal member having a free end opposite said first end; and, said stop means being formed on said free end in the form of an angle.

4. The fluid-friction coupling of claim 3, said stop means being a projection pressed out of said partition wall.

5. The fluid-friction coupling of claim 1, said limit temperature being 150° C.

6. A fluid-friction coupling comprising:

a housing defining a space;

said housing including a partition wall separating said space into a reservoir chamber defining an oil-wet region and a work chamber;

a drive disc rotatably mounted in said work chamber;

a drive shaft connected to said drive disc so as to be rotatable therewith;

said partition wall having a valve port formed therein;

a valve arm mounted in said housing for controlling said valve port and being movable in a closure direction through a total displacement (s) from an open position wherein said valve port is clear to a closed position wherein said valve port is closed;

external bimetal means mounted outside of said housing for actuating said valve arm so as to move said valve arm from said open position to said closed position;

internal bimetal means mounted in said oil-wet region of said reservoir chamber for imparting a movement to said valve arm in the closure direction when said internal bimetal means reaches a predetermined limit temperature;

said internal bimetal means being an internal bimetal member having a first end at which said bimetal member is attached to said housing;

stop means mounted in said reservoir chamber for limiting the movement imparted to said valve arm by said internal bimetal member to only a partial displacement ($s_1$) toward said closed position thereby leaving a residual displacement ($s_0$) of said total displacement (s);

said valve arm having an opening formed therein;

said internal bimetal member being a plate-shaped snap disc defining a diameter and having a central projection projecting through said opening and defining said one end thereof;

said one end being attached to said partition wall; and, said stop means including a plurality of stop projections formed on said partition wall so as to be within said diameter for limiting the movement imparted by said internal bimetal member to said valve arm.

7. The fluid-friction coupling of claim 6, said valve arm having additional openings formed therein corresponding to respective ones of said stop projections.

8. The fluid-friction coupling of claim 6, said stop projections being arranged laterally of said valve arm.

9. The fluid-friction coupling of claim 6, said snap disc being configured to have a concave start form and a convex form when said limit temperature is exceeded.

10. The fluid-friction coupling of claim 6, further comprising a rivet for connecting said snap disc to said partition wall at said central projection.

11. A fluid-friction coupling comprising:

a housing defining a space;

said housing including a partition wall separating said space into a reservoir chamber defining an oil-wet region and a work chamber;

a drive disc rotatably mounted in said work chamber;

a drive shaft connected to said drive disc so as to be rotatable therewith;

said partition wall having a valve port formed therein for permitting a flow of viscous medium from said reservoir chamber to said work chamber;

an internal bimetal member arranged in said reservoir chamber and having a first end at which said bimetal member is attached to said housing;

said internal bimetal member being movable in a direction toward said valve port from a first position at a first distance away from said valve port for passing a first flow of the viscous medium from said reservoir chamber to said work chamber to a second position at a second distance ($s_1$) away from said valve port and said second distance ($s_1$) being less than said first distance so as to cause said internal bimetal member to leave a residual cross section through which a second flow of said viscous medium can pass from said reservoir chamber to said work chamber which is less than said first flow;

said internal bimetal member being movable from said first position to said second position when said bimetal member reaches a predetermined limit temperature;

stop means mounted in said reservoir chamber for limiting the movement of said internal bimetal member and defining said second position; and, said stop means being immovably fixed with respect to one of said partition wall and said bimetal member.

12. The fluid-friction coupling of claim 11, said stop means being a stop provided on said partition wall.

13. The fluid-friction coupling of claim 11, said bimetal member having a free end opposite said first end; and, said stop means being formed on said free end in the form of an apple.

14. The fluid-friction coupling of claim 11, said stop means being a projection pressed out of said partition wall.

15. The fluid-friction coupling of claim 11, said limit temperature being 150° C.

* * * * *

UNITED STATES PATENT AND TRADEMARK OFFICE
CERTIFICATE OF CORRECTION

PATENT NO. : 5,263,563

DATED : November 23, 1993

INVENTOR(S) : Hans Martin

It is certified that error appears in the above-identified patent and that said Letters Patent is hereby corrected as shown below:

On the Title page, under "References Cited", item [56]: please delete
"3,339,689  9/1967  Sutaruk ............. 92/58 B X" and substitute therefor
-- 3,339,689  9/1967  Sutaruk ............ 192/58 B XR --.

In the abstract, line 22: delete "And" and substitute -- A -- therefor.

In column 8, line 9: delete "apple" and substitute -- angle -- therefor.

Signed and Sealed this

Third Day of May, 1994

Attest:

BRUCE LEHMAN

*Attesting Officer*    *Commissioner of Patents and Trademarks*